United States Patent
Ikeno et al.

(10) Patent No.: US 8,228,263 B2
(45) Date of Patent: Jul. 24, 2012

(54) STACKED LCD UNIT

(75) Inventors: Hidenori Ikeno, Kanagawa (JP); Takashi Yatsushiro, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 989 days.

(21) Appl. No.: 12/179,606

(22) Filed: Jul. 25, 2008

(65) Prior Publication Data

US 2009/0027598 A1 Jan. 29, 2009

(30) Foreign Application Priority Data

Jul. 25, 2007 (JP) .................... 2007-193453

(51) Int. Cl.
G09G 5/00 (2006.01)
(52) U.S. Cl. ................ 345/4; 345/87; 345/89
(58) Field of Classification Search .............. 345/4, 87, 345/89; 349/123
See application file for complete search history.

(56) References Cited

U.S. PATENT DOCUMENTS

| | | | |
|---|---|---|---|
| 2003/0156086 A1* | 8/2003 | Maeda et al. | 345/89 |
| 2005/0190329 A1* | 9/2005 | Okumura | 349/123 |
| 2005/0212737 A1* | 9/2005 | Yoshihara et al. | 345/87 |
| 2007/0063925 A1* | 3/2007 | Yoshihara et al. | 345/4 |

FOREIGN PATENT DOCUMENTS

| | | |
|---|---|---|
| JP | 59-189625 | 12/1984 |
| JP | 64-010223 | 1/1989 |
| JP | 02-079583 | 3/1990 |
| JP | 08-087022 | 4/1996 |
| JP | 11-024102 | 1/1999 |
| JP | 2001-281632 | 10/2001 |
| JP | 2003-098506 | 4/2003 |
| JP | 2007-286413 | 1/2007 |
| WO | 2007-040127 | 4/2007 |
| WO | 2007-110948 | 10/2007 |

OTHER PUBLICATIONS

JP Office Action dated Mar. 21, 2012, with English Translation, Application No. 2007-193453.

* cited by examiner

*Primary Examiner* — Quan-Zhen Wang
*Assistant Examiner* — Troy Dalrymple
(74) *Attorney, Agent, or Firm* — Young & Thompson

(57) ABSTRACT

A LCD unit includes a plurality of LC panels stacked one on another. If a picture to be displayed on the LCD unit is a still picture, one of the LC panels consecutively scans plurality of rows of pixels in a direction opposite to the scanning direction of the rows of pixels in the rest of LC panels. If the picture is a moving picture, all the LC panels consecutively scans in the same direction.

7 Claims, 6 Drawing Sheets

STACKED LCD UNIT

This application is based upon and claims the benefit of priority from Japanese patent application No. 2007-193453 filed on Jul. 25, 2007, the disclosure of which is incorporated herein in its entirety by reference.

TECHNICAL FIELD

The present invention relates to a stacked liquid crystal display (LCD) unit and, more particularly, to a direct-view LCD unit including a plurality of LC panels stacked one on another. The present invention also relates to an electronic display system including such a direct-view LCD unit.

BACKGROUND ART

LCD devices have the advantages of achieving a lower power dissipation and a higher resolution, and thus are used in a variety of applications from a small-size portable telephone to a large-size television (TV) monitor. However, the contrast ratio of a LCD device alone is as low as 1000:1 at most, which is far lower than the contrast ratio of the other display devices such as a CRT, a plasma display device which is also used as a TV monitor, ad a discharge-type display device referred to as filed-emission display (FED) device or surface-emission display (SED) device which has a contrast ratio of around tens of thousands. Thus, it has been pointed out that the LCD device has the problem of poor image-expression capability upon display of an image having a dark picturesque portion such as an image included in a movie.

For solving the above problem, a technique has been developed wherein the light intensity of a backlight source of the LCD device is controlled depending on the image to be displayed, without improving the contrast ratio of the LCD device itself, to thereby improve the contrast ratio of the LCD device as a whole. However a cold cathode tube is generally employed in a surface-emitting backlight source, the cold cathode tube having a narrow dynamic range of the luminance. Thus, even if the light intensity of the backlight source is controlled depending on the image to be displayed, the improvement of the contrast ratio remains on the order of 2000:1 to 3000:1 at most. In addition, the cold cathode tube, which has an elongate shape, may suffer from a poorly controlled property of the luminance (brightness) in a partial screen area if there are a bright area and a dark area at the same time on the screen. This degrades the improvement of the contrast ratio obtained by the luminance control of the backlight source. In short, the LCD device suffers from reduction in the effective contrast ratio upon display of a lower-luminance area with a superior reproducibility on the screen, which also includes therein a higher-luminance area.

For avoiding the above problem, it is desired to markedly raise the contrast ratio of the LCD device. However, the contrast ratio of the LCD device alone is around 1000:1 at most, as described before Patent Publications 1 and 2 describe a technique for improving the contrast ratio of the LCD device as a whole without significantly improving the contrast ratio of the LCD device itself. In this technique, a plurality of LC panels are stacked one on another to form a stacked LCD unit, thereby reducing the black luminance and thus improving the contrast ratio of the LCD unit as a whole. The term "black luminance" as used herein means a luminance on a screen supplied with a gray-scale level signal of a lowest luminance, i.e., black signal.

FIG. 6 shows a typical LCD unit including two LC panels stacked one on another. The LCD unit includes a first polarizing film 901, a first LC panel 941, a second polarizing film 902, a second LC panel 942, and a third polarizing film 903, which are consecutively arranged from an optical incidence side of the LCD unit. The first LC panel 941 includes a TN-mode liquid crystal (LC) layer 931, and a pair of transparent substrates 911 and 912 including transparent electrodes 921 and 922 in the vicinity of the LC layer 931. The second LC panel 942 includes a TN-mode LC layer 932, and a pair of transparent substrates 913 and 914 including transparent electrodes 923 and 924 in the vicinity of the LC layer 932. The transparent electrodes 921 and 923 of the LC panels 941 and 942 are pixel electrodes to which a drive signal is supplied from a drive circuit 951, whereas the transparent electrodes 922 and 924 of the LC panels 941 and 942 are common electrodes.

If the contrast ratio of the LC panel 941, 942 alone is measured using a laser beam, the contrast ratio will be around 10 to 15. On the other hand, if the overall contrast ratio of the LCD unit including the LC panels 941, 942 is measured, the overall contrast ratio improves up to around 100:1. If the contrast ratio of a LCD unit including three LC panels is measured, the contrast ratio will improve up to around 1000:1, whereby a superior contrast ratio far exceeding the limit of the contrast ratio of the LC panel alone will be achieved. The Patent Publications as described above are as follows:

Patent Publication 1—JP-1989-10223A
Patent Publication 2—JP-UM-1984-189625A

In the LCD unit described in Patent Publication 1, two LC panels 941, 942 stacked one on another are used to achieve a higher contrast ratio, wherein the two LC panels are driven by a common signal supplied from a single signal source. In this configuration, corresponding positions (pixels) of the two LC panels overlapping each other are driven by the same signal at the sane timing irrespective of whether the picture to be displayed therein is a still picture or a moving picture. This may cause overlapping of the transmittance change of both the LC panels in a frame period from the start of writing the image data to the end of holding the image data, thereby amplifying the amount of transmittance change or flicker in the frame period. The amplified flicker incurs the problem of sense of discomfort in an observer of the LCD unit.

SUMMARY OF THE INVENTION

In view of the above problem in the stacked LCD unit as described above, it is an object of the present invention to provide a stacked LCD unit including a plurality of LC panels stacked one on another, which is capable of suppressing the flicker occurring therein.

The present invention provides a liquid crystal display (LCD) unit including; a plurality of liquid crystal (LC) panels each including an array of pixels, the LC panels being stacked one on another so that corresponding pixels of the LC panels are aligned with one another for display of a picture; and a backlight source emitting light onto a rear side of the stacked LC panels, wherein; a plurality of rows of the pixels of at least one of the LC panels are scanned consecutively in a first scanning direction from a first row of the pixels, and a plurality of the pixels of rest of the LC panels are consecutively scanned in a second scanning direction from a second row of the pixels; and the first scanning direction is opposite to the second scanning direction, and/or the first row is different from the second row.

The present invention also provides a liquid crystal display (LCD) unit including: a plurality of liquid crystal (LC) panels each including an array of pixels, the LC panels being stacked one on another so that corresponding pixels of the LC panels are aligned with one another; a backlight source emitting light onto a rear side of the stacked LC panels; and a mode switching section for selecting one of a first mode wherein a plurality of rows of the pixels of the LC panels are scanned consecutively in the same direction from the same row, and a second mode wherein a plurality of rows of the pixels of at least one of the LC panels are scanned consecutively in a first scanning direction from a first row of the pixels, a plurality of the pixels of rest of the LC panels are consecutively scanned in a second scanning direction from a second row of the pixels, and the first scanning direction is opposite to the second scanning direction, and/or the first row is different from the second row.

The above and other objects, features and advantages of the present invention will be more apparent from the following description, referring to the accompanying drawings.

EXEMPLARY EMBODIMENTS

Figure 1:
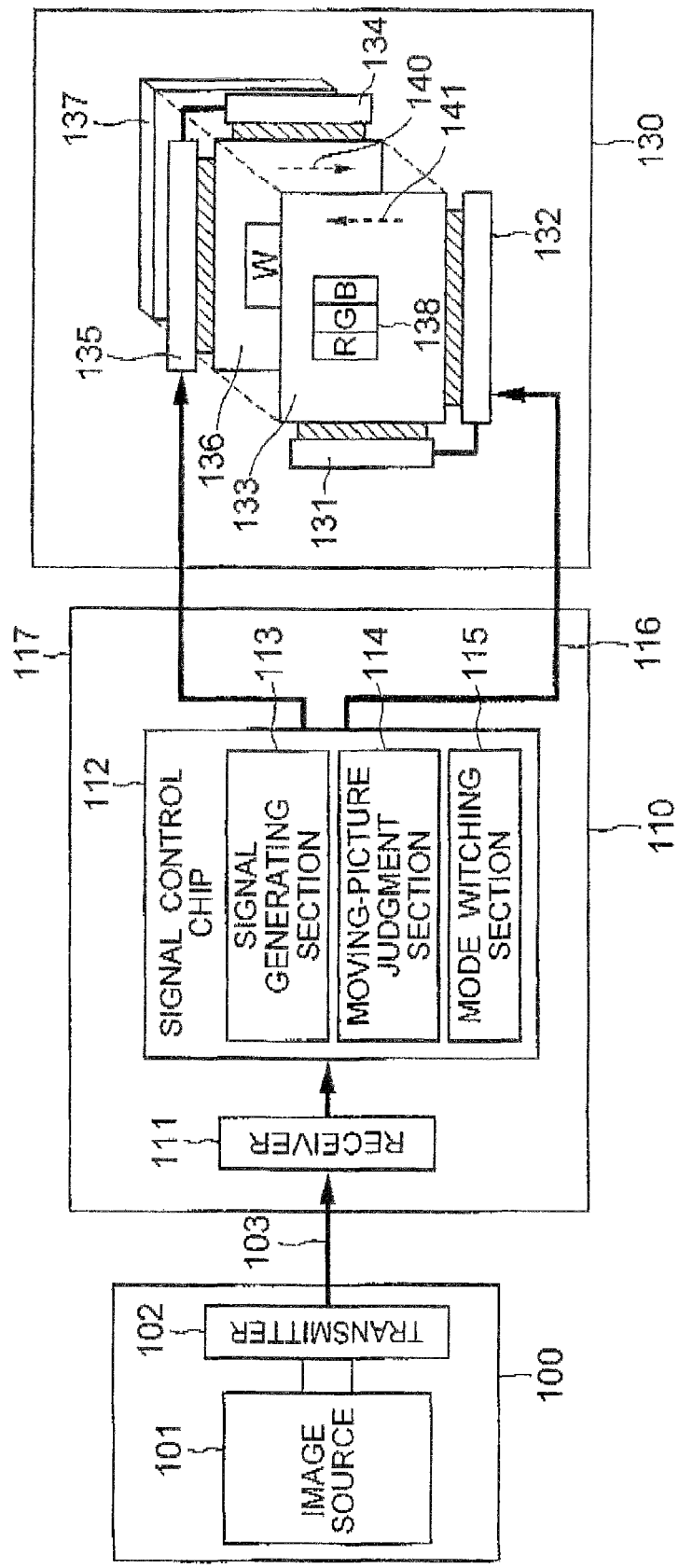
FIG. 1 is a block diagram of an electronic display system according to a first embodiment of the present invention.

Now, exemplary embodiments of the present invention will be described with reference to accompanying drawings, wherein similar constituent elements may be designated by similar reference numerals.

FIG. 1 shows a electronic display system (LCD system) according to a first embodiment of the present invention. The LCD system includes an image source unit 100, a signal processing unit 110 and a stacked LCD unit 130 which are interconnected via cables 103, 116, 117. The stacked LCD unit 130 includes a par of LC panels 133, 136 stacked one on another.

The image source unit 100 includes an image source 101 and a transmitter 102. The image source 101 outputs a picture (image data) to be displayed on the LCD unit 130. The transmitter 102 converts the image data output from the image source 101 into an image signal suitable for transmission, and delivers the image signal to the signal processing unit 110 via cable 103. The image signal delivered to the signal processing unit 110 from the image source unit 100 includes a series of signals (serial signal), which is delivered from the signal processing unit 110 to the pair of LC panels 133, 136. However, the serial signal delivered to the first LC panel 133 is different from the serial signal delivered to the second LC panel 136.

THC63DV164 chip supplied from Xilinx Electronics Corp., for example, may be used as the transmitter 102. In this case, the transmitter 102 converts the parallel data output from the image source 101 into a serial signal, and delivers the converted serial signal to the signal processing unit 110 via a cable, e.g., telecommunication cable 103. However, since a typical DVI output suitable to a digital interface of a personal computer may be used, the transmitter 102 is not restricted to the above chip, and may be one which can output an equivalent signal. The image source unit 100 may be a personal computer having a typical DVI output. The signal transmission may be performed between any transmitter and a corresponding receiver, wherein the signal for transmission may be other than the DVI output, and may be a digital signal transmitted via a plurality of digital signal cables having a suitable transmission rate or may be an analog signal.

The signal processing unit 110 includes a receiver 111 and a signal control chip 112. The receiver 111 receives the image signal transmitted from the image source unit 100. The signal control chip 112 includes a signal generating section 113, a moving-picture judgment section 114, and a mode switching section 115. The signal generating section 113 performs image processing onto the signal received by the receiver 111, to generate a pair of pictures to be displayed on the two LC panels 133 and 136 of the LCD unit 130. The signal generating section 113 delivers the signals generated by the image processing to the LC panels 133 and 136 via signal cables 116 and 117. The signal delivered via the signal cables 116 and 117 are LVDS (low-voltage differential-signaling) signal, for example.

The signal control chip 112 mounted on the signal processing unit 110 may be of a Stratix series, or FPGA (field programmable gate array), supplied from Altera Corp. Since this chip also has a LVDS transmitter function, use of this chip provides a simple circuit configuration. It is to be noted however that the built-in memory of this chip has a smaller capacity, and it is preferable that an external buffer memory be provided for this chip depending on the situation. Use of the FPGA means that the logic circuit is configured by a static RAM. Therefore, the configuration of the logic circuit should be provided from a ROM device provided outside the chip upon turn ON of the chip. The reason for using the FPGA is that the FPGA is especially suitable for use in a test purpose or a small-lot production. Types of the FPGA include an EEPROM capable of being rewritten electrically, a PROM and a onetime PROM, all of which can be basically used for the present invention. If a large-lot production is intended, the logic circuit of the FPGA may be replaced by a gate array. On the other hand, if a large scale is intended, the FPGA may be replaced by a full-custom LSI to obtain the advantage of the present invention.

The LCD unit 130 includes a first LC panel 133, a second LC panel 136, ad a light source 137, which are consecutively arranged from the front side of the LCD unit 130. In the LCD unit 130, the first LC panel 133 and the second LC panel 136 are stacked one on another, with an array of pixels 138 of the first LC panel 133 being aligned with an array of pixels of the second LC panel 136. Although FIG. 1 shows a single pixel 138 including three (RGB) sub-pixels, a plurality of pixels are arranged in an array. A plurality of scanning lines (not shown) extend in a row direction to consecutively scan respective rows of the pixels 138, and a plurality of data lines (not shown) extend in a column direction to provide image data to respective columns of the pixels 138.

The light source 137 is provided on the rear side of the LCD unit 130 far from the observer to supply backlight to the LC panels 133, 136. The first LC panel 133 includes therein color filters, and is used as a color LC panel, and the second LC panel 136 is used as a monochrome LC panel. A vertical driver 131 and a horizontal driver 132 are provided for driving the first LC panel 133, and another vertical driver 134 and another horizontal driver 135 are provided for driving the second LC panel 136.

In the LCD unit 130, the scanning direction of the first LC panel 133 is opposite to the scanning direction of the second LC panel 136. More specifically, the first LC panel 133 is scanned upward from the bottom row of the pixels on the screen toward the top row of the pixels as denoted by an arrow 141, whereas the second LC panel 136 is scanned downward from the top row of the pixels on the screen toward the bottom row of the pixels as denoted by an arrow 140. The scanning directions of the LC panels 133 and 136 are determined by the vertical drivers 131 and 134, respectively.

The opposite scanning directions used in the present embodiment achieve reduction of the noticeable flicker, the reason of which will be described hereinafter. In the case of a TFT-driven LC panel, each pixel is driven by a constant-amount electric charge injected at a write timing of the each pixel. In the write timing, the writing voltage Vs is expressed using the amount of charge Qs provided to the pixel electrode and the pixel capacitance C1, by the following simple formula:

$$Vs = QS/C1.$$

If the amount of charge Qs remains as it is in each pixel until the next write timing, the write voltage Vs in the pixel will be maintained. However, the Qs decreases due to the leakage current of the TFT etc. by an amount Qr until the next write timing, to thereby reduce the initial pixel voltage Vs down to a final voltage Ve at the end of a frame. The final voltage Ve is expressed by the following formula:

$$Ve = (Qs-Qr)/C1$$

In each pixel, the reduction of voltage by Vs−Ve changes the transmittance of the LC layer to change the luminance or brightness of each pixel. The observer of the LCD unit notices the change of the luminance as a phenomenon of flicker.

In the structure of LCD unit wherein two LC panels are stacked for improving the contrast ratio, the optical transmittance of the LCD unit is a product of the optical transmittance of the first LC panel by the optical transmittance of the second LC panel. It is assumed here that the each LC panel has a transmittance change ΔL due to the flicker. The ΔL may be a positive or negative value depending on the drive scheme of the LC panel. If the transmittance of both the LC panels changes from L to L-ΔL, then the overall transmittance change of the two LC panels is expressed by the following formula:

$$L^2 - (L-\Delta L)^2 = 2L \times \Delta L - (\Delta L)^2.$$

The above formula means that the transmittance change of each LC panel caused by a flicker, if any, is amplified to thereby degrade the image quality of the LCD unit.

The present embodiment employs an opposite-scanning-direction mode wherein the two LC panels 133, 136 in the LCD unit 130 are scanned in opposite directions. An example of the opposite-scanning-direction mode is such that a top pixel of the first LC panel 133 has a luminance of L due to immediately after the write operation, whereas a corresponding top pixel of the second LC panel 136 has a luminance of L-$^\Delta$L due to immediately before the write operation. Therefore, the overall transmittance change is expressed by the following formula:

$$L2 - L \times (L-^\Delta L) = L^\Delta L$$

Comparing the overall transmittance change in the case of using the same scanning direction against the overall transmittance change in the case of using the opposite scanning directions, the latter has a lower value by a difference LΔL, assuming that $(\Delta L)^2$ is negligible due to the smaller order of value of ΔL.

The intensity of flicker was experimentally measured using a LCD unit manufactured according to the above exemplary embodiment. Measurement was first performed for the case of a comparative example using the same scanning direction, which revealed a flicker intensity above −30 dB. Measurement was then performed for the case of the embodiment using the opposite scanning directions, which revealed a flicker intensity lower than −30 dB. This experimental measurement showed the advantage of the opposite scanning directions over the same scanning direction.

In the case of using the opposite scanning directions for the two LC panels, there is no defect in display of a still picture. On the other hand, there is a problem to be solved in display of a moving picture wherein the image is changed between frames, as will be detailed hereinafter. The moving picture has a image changed between an n-th frame and an (n+1)th frame, and continues the change of image along the elapse of time. In the case of opposite scanning directions for the two stacked LC panels, after the data of n-th frame is written into the first LC panel 133 and second LC panel 136, the data of (n+1)th frame is written into both the LC panels. In this (n+1)th frame, the data of nth frame is replaced by the data of (n+1)th frame in the first LC panel 133 consecutively from the bottom toward the top of the screen, whereas the data of n-th frame is replaced by the data of (n+1)th frame in the second LC panel 136 consecutively from the top toward the bottom of the screen.

At the initial stage of writing data during the (n+1)th frame, the data of top row of the pixels in the first LC panel 133 is replaced by the data of (n+1)th frame, whereas the data of top row of the pixels in the second LC panel 136 remains as the data of n-th frame. Similarly, the data of bottom row of pixels in the second LC panel 136 is replaced by the data of (n+1)th frame, whereas the data of bottom row of pixels in the first LC panel 133 remains as the data of n-th frame. That is, in the (n+1)th frame as well as the other frames, there is a discrepancy between the image of the pixels in the first LC panel 133 and the image of the corresponding pixels in the second LC panel 136, and this discrepancy is removed in only a short time period that starts after all the data of moving picture is replaced in a frame and ends before the replacement of the data starts in the next frame, thereby degrading the image of the moving picture.

Figure 2:
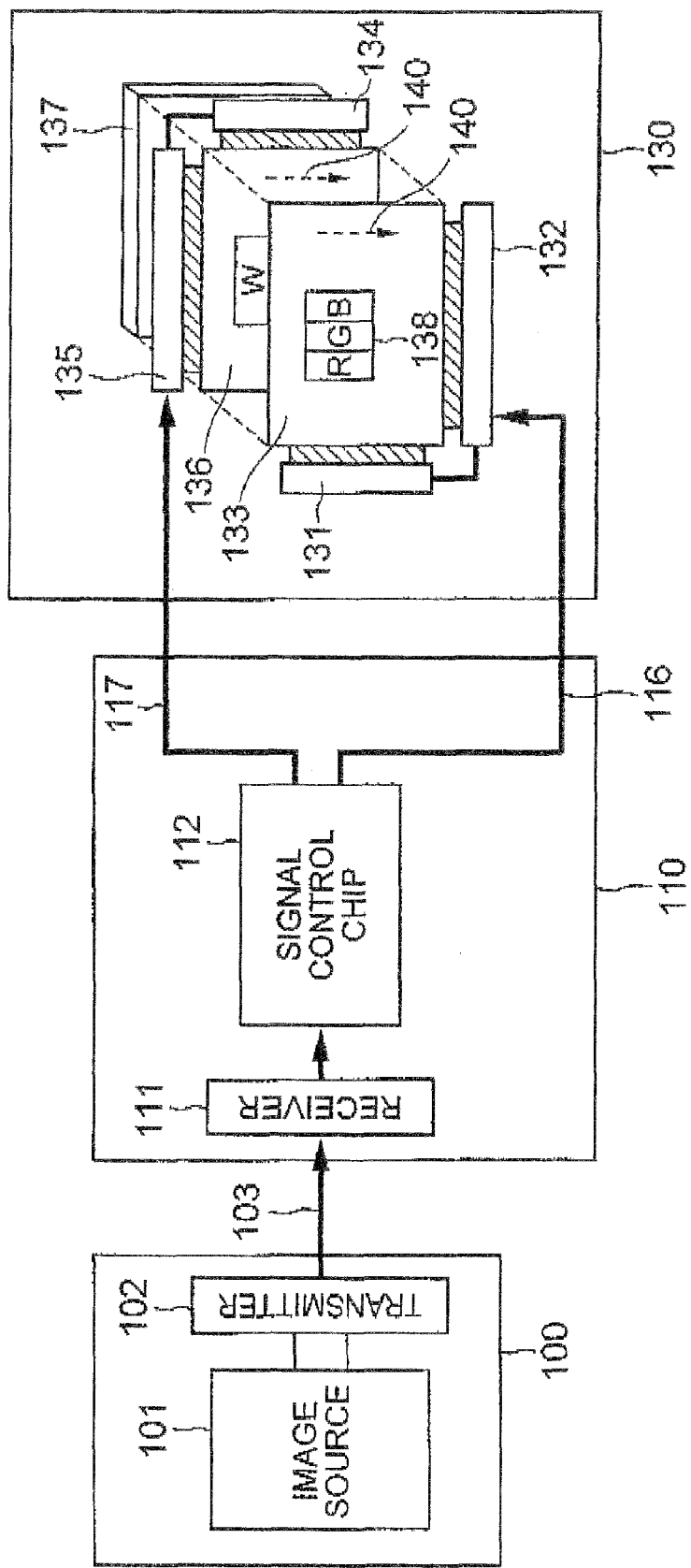
FIG. 2 is a block diagram of an electronic display system according to a second embodiment of the present invention.

As described above, the image quality of moving picture, wherein different image data are delivered for respective frames, is degraded by the opposite scanning directions. This problem can be solved by using the same scanning direction upon display of a moving picture. Thus, the LCD unit of the present embodiment employs a first mode using the same scanning direction in display of the moving picture, and a second mode using the opposite scanning directions in display of the still picture. The moving-picture judgment section 114 judges whether or not the delivered image data is for a moving picture, and the mode switching section 115 changes the display mode between the first mode and the second mode based on the judgment by the moving-picture judgment section 114. The mode switching section 115 selects the first mode, i.e., the same scanning direction if the picture is a moving picture. FIG. 2 shows the LCD unit of FIG. 1 operating in the same-scanning-direction mode for display of a moving picture. In FIG. 2, both the first and second LC panels 133 and 136 scan the pixels in the downward direction from the top to the bottom of the screen as denoted by an arrow 140. Although the same scanning direction provides an adverse influence on the flicker, the observer conceives a less amount of flicker upon observing the moving picture due to the change of the image between adjacent frames, compared to the case of observing a sill picture.

Back to FIG. 1, the mode switching section 115 delivers a signal indicating whether the vertical driver 131 of the first LC panel 133 should scan the pixels in the downward direction or in the upward direction depending on the selected mode. The vertical driver 131 has a configuration wherein the scanning direction can be switched between the upward direction ad the downward direction, and determines the scanning direction based on the signal delivered from the mode switching section 115. The signal control chip 112 switches the order of the image data transmitted from the signal generating section 113. The signal control chip 112 transmits the image signal sequentially from the top pixels toward the bottom pixels if the scanning direction is the downward direction, whereas transmits the image signal sequentially from the bottom pixels toward the top pixels if the scanning direction is the upward direction.

The moving picture judgment section 114 judges whether or not the picture is a moving picture based on the degree of similarity or difference of image data on the entire screen between the image of n-th frame and the image of (n+1)th frame received from the image source unit 100, by comparing these images. More specifically, a frame memory provided in the signal processing unit 100 stores therein the image data of a precedent frame, which is compared against the data of the present frame, to judge the degree of difference in the entire frame data. If the degree of difference is higher than or lower than a threshold, the signal processing unit 110 judges that the received picture is a moving picture or a still picture. The judgment may be performed by comparing two consecutive frame data, or may be performed by comparing three or more than three consecutive frame data.

Judgment as to the moving picture/still picture may use a single threshold that divides the moving picture from the still picture; however, this may be difficult in the case of a still picture having a variation in the vicinity of the threshold. Thus, it is preferable to use two different values for the threshold, including a larger one (threshold A) for judgment of the moving picture and a smaller one (threshold B) for judgment of the still picture. In this case, the signal control chip 112 judges that the picture is a moving picture if the difference is above or equal to the threshold A, whereas judges that the picture is a still picture if the difference is equal to or below the threshold B.

It is noted that since a judgment of difference between data of two frames may be affected by noise, such as caused by movement of a mouse, cursor or window upon switching of the scanning direction, a frequent or periodical switching of the scanning direction may occur. For avoiding such a frequent switching operation, it may be effective to provide a hysteresis in the time period before switching. More specifically, for example, a switching from a still picture to a moving picture is performed after the judgment thereof is continued for one second, or sixty frames, whereas a switching from a moving picture to a still picture is performed after the judgment thereof is continued for thirty seconds, or 1800 frames.

The moving-picture judgment section 114 judges that the picture shifted into or remains in a moving picture, if the state wherein ¼ of the pixels, for example, among 640×480 pixels of a VGA-size screen is changed continues for thirty seconds in succession. The moving-picture judgment section 114 judges that the picture shifted into or remains in a still picture, if the state wherein the number of pixels changed is equal to or below ¹⁄₁₆ of the 640×480 pixels continues for one second in succession. This judgment prevents the frequent switching between the still picture and the moving picture from occurring, thereby allowing the observer not to feel a sense of discomfort on the screen. It is preferable that the switching itself be performed after a write operation for a frame during a vertical flyback period. The present embodiment also employs this type of switching for the scanning direction. If the switching is performed outside the vertical flyback period, however, there is no significant degradation in the image quality because the image degradation occurs only in a single frame period and will hardly be conceived by the observer.

Figure 3:
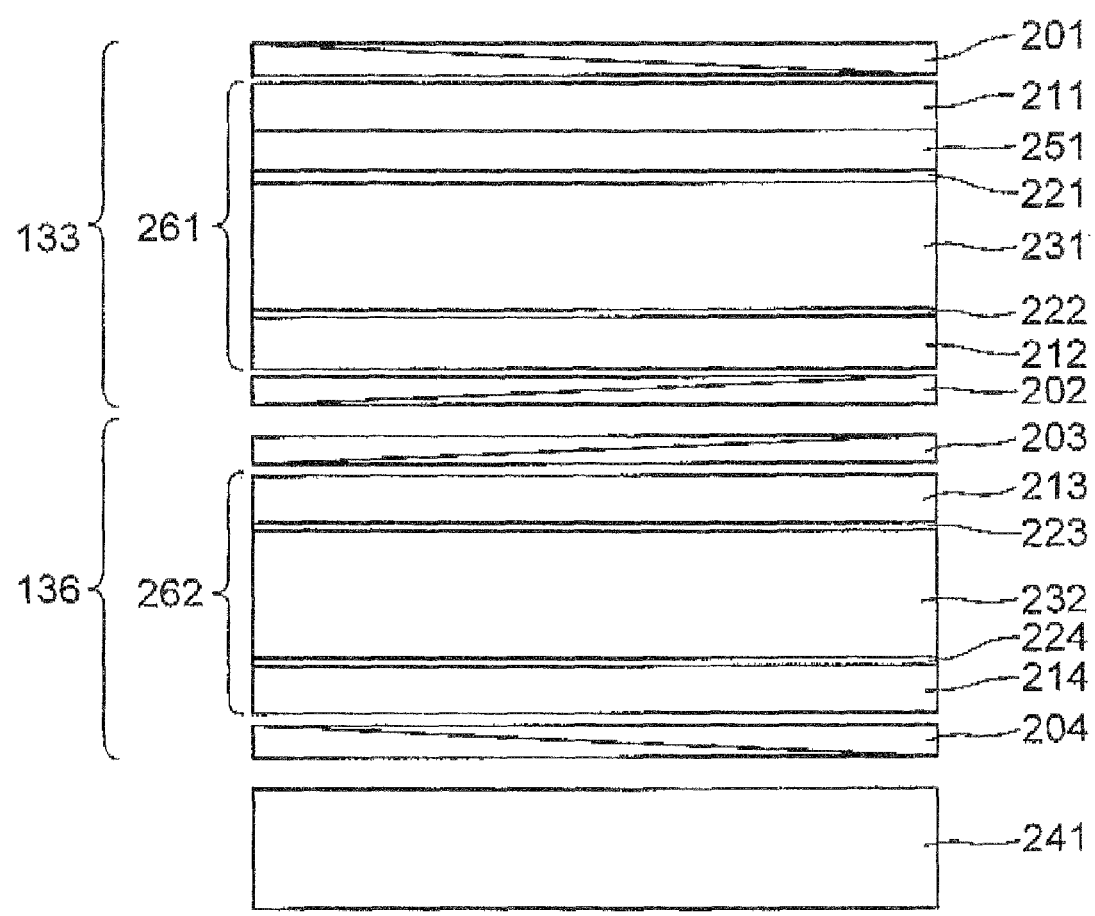
FIG. 3 is a sectional view of the LCD unit used in the electronic display system of FIGS. 1 and 2.

FIG. 3 shows a sectional view of the LCD unit 130 shown in FIG. 1. The LCD unit 130 includes a polarizing film 201, a transparent substrate 211 color filter layers 251 an orientation film 221, a LC layer 231, an orientation film 222, a transparent substrate 212, a polarizing film 202, a polarizing film 203, a transparent substrate 213, an orientation film 223, a LC layer 232, an orientation film 224, a transparent substrate 214, a polarizing film 204, and a surface-emission light source 241, which are consecutively arranged from the light emitting side of the LCD unit. In the following description, a combination of the transparent substrate 211, color filter layers 251, orientation film 221, LC layer 231 orientation film 222, and transparent substrate 212 is referred to as a first LC element 261, for the sake of convenience for description. A combination of the first LC element 261 and the polarizing film 201 and polarizing film 202 sandwiching therebetween the first LC element 261 is referred to as the first LC panel 133. Similarly a combination of the transparent substrate 213, orientation film 223, LC layer 232, orientation film 224, and transparent substrate 214 is referred to as a second LC element 262, and a combination of the second LC element and the polarizing film 203 and polarizing film 204 sandwiching therebetween the second LC element 262 is referred to as the second LC panel 136.

The surface-emission light source 241 in FIG. 3 corresponds to the light source 137 shown in FIG. 1. The surface-emission light source 241 configures a planar light source emitting light from the planar surface thereof, and emits light onto the first LC panel 133 and second LC panel 136 through the rear side thereof. The light emitted from the surface-emission light source 241 consecutively passes the second LC panel 136 and first LC panel 133, to reach the observer. Control of transmission of the light in the respective pixels of the first LC panel 133 ad second LC panel 136 provides a desired image or picture to the observer.

Figure 6:
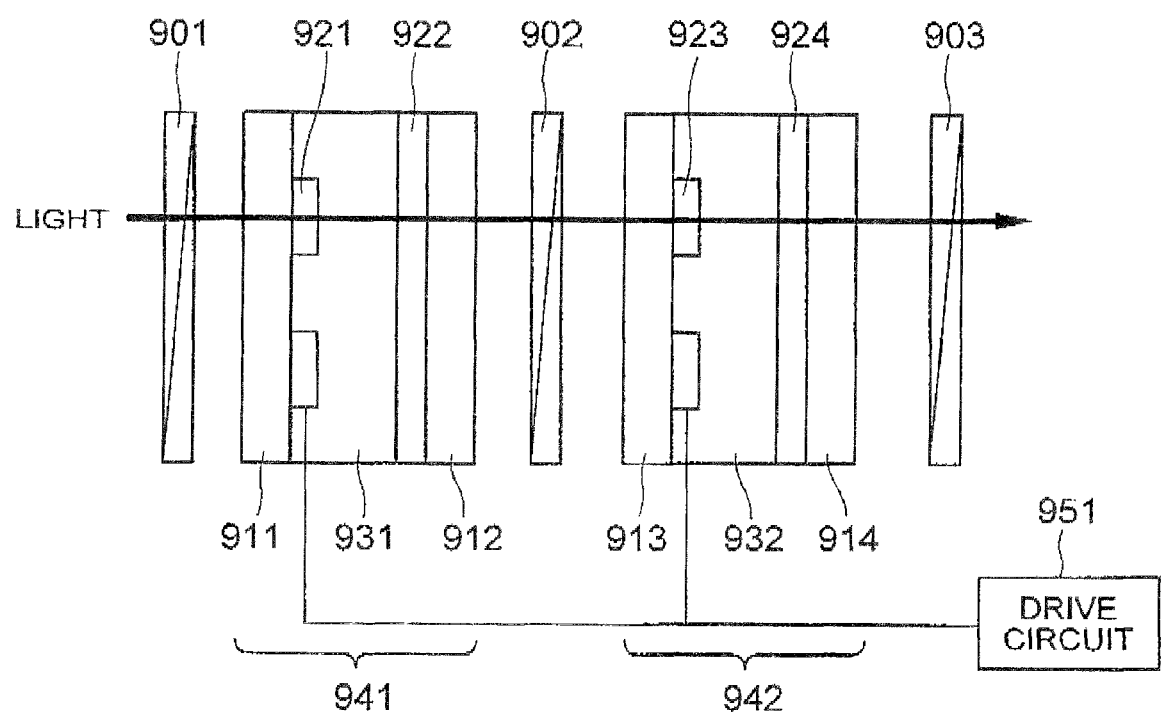
FIG. 6 is a typical LCD unit including a plurality of LC panels stacked one on another.

A fabrication process of the LCD unit will be described hereinafter. Fabrication of the first LC panel 133 will be first described. The transparent substrate 212 is provided with a matrix of electrode pairs, such as 923 shown in FIG. 6, on the surface of the transparent substrate 212 near the LC layer 231. A three-terminal nonlinear device, such as a TFT, is provided for a pixel electrode of each of the electrode pairs, to associate each pixel with a corresponding TFT. Each LC panel operates in an in-plain-switching (IPS) mode using a lateral electric field, generated by a pixel electrode and a corresponding common electrode each configuring a comb-teeth electrode. The color filter layers 251 include a single stripe layer for each sub-pixel to represent one of three colors, i.e., red(R), green(G) and blue(B) in the pixel. Three sub-pixels representing three different colors configure a single pixel in the first LC panel 133.

Orientation films 221, 222 are formed on the surface of the color filter layers of the transparent substrate 211 and the surface of the transparent substrate 212 on which the matrix of electrode pairs is formed, respectively, by coating and subsequent orientation processing, such as a rubbing treatment. The transparent substrate 211 and transparent substrate 212 are then assembled with an intervention of a specific gap so that the orientation film 221 and orientation film 222 oppose each other with the orientation directions thereof being parallel with or opposite to each other. The specific gap is then provided with LC such as ZLI4792 from Merck Co. by injection thereof, to configure the first LC element 261. The first LC element 261 is then sandwiched between the polarizing film 201 and the polarizing film 202 to configure the first LC panel 133. The polarizing films may be SEG1224 from Nitto Denko Corp. The polarizing films 201 and 202 are arranged so that the light transmission axes or light absorption axes thereof are perpendicular to each other, and the light absorption axis of one of the polarizing films 201 and 202 is parallel to the orientation direction of the LC layer 231.

The fabrication process for the second LC panel 136 will be then described. This process is similar to the fabrication process for the first LC panel 133 except that the step of forming the color filter layers is not needed for the second LC panel 136. More specifically, the transparent substrate 214 is provided with a matrix of electrode pairs, such as 921 in FIG. 6, on the surface of the transparent substrate 214 near the LC layer 232. A three-terminal nonlinear device, such as a TFT, is provided for a pixel electrode of each of the electrode pairs, to associate each pixel with a corresponding TFT. Since the second LC panel 136 does not include color filter layers, the size of each pixel of the second LC panel 136 may be designed to correspond to the size of the pixel of the first LC panel 133 including three sub-pixels. In an alternative, the configuration of a single pixel of the second LC panel 136 may correspond to the configuration of a sub-pixel of the first LC panel 133, except for the absence of the color filter layers. The second LC element 262 thus fabricated is sandwiched between the polarizing film 203 and the polarizing film 204 to configure the second LC panel 136. The polarizing films 203 and 204 are arranged so that the light transmission axes or light absorption axes thereof are perpendicular to each other, and the light absorption axis of one of the polarizing films 203 and 204 is parallel to the orientation direction of the LC layer 232.

The first LC panel 133 ad second LC panel 136 are then stacked one on other after alignment of corresponding pixels therebetween. The surface-emission light source 241 is then arranged on the rear side of the second LC panel 136 to configure the LCD unit 130. Upon stacking the first LC panel 133 onto the second LC panel 136, the orientation directions thereof are arranged parallel or perpendicular to each other so that the light passed by the polarizing film 202 may be passed by the polarizing film 203 as much as possible. In an alternative, one of the polarizing films 202 and 203 may be omitted, thereby allowing both the LC panels to share therebetween the other of the polarizing films 202 and 203.

In the LCD unit 130 of the present embodiment, the color filter layers 251 are provided only for the first LC panel 133. In this case, when the field of view is physically moved parallel to the LC panels, the transmission luminance is not substantially varied depending on the viewing angle, differently from a LCD unit including color filter layers on both the LC panels. However, it is to be noted that if both the LC panels 133 and 136 are driven by the same signal supplied from a common signal source, the distance between the LC layer 231 and the LC layer 232 causes a parallax which degrades the image quality of the LCD unit as will be detailed hereinafter.

Figure 4:
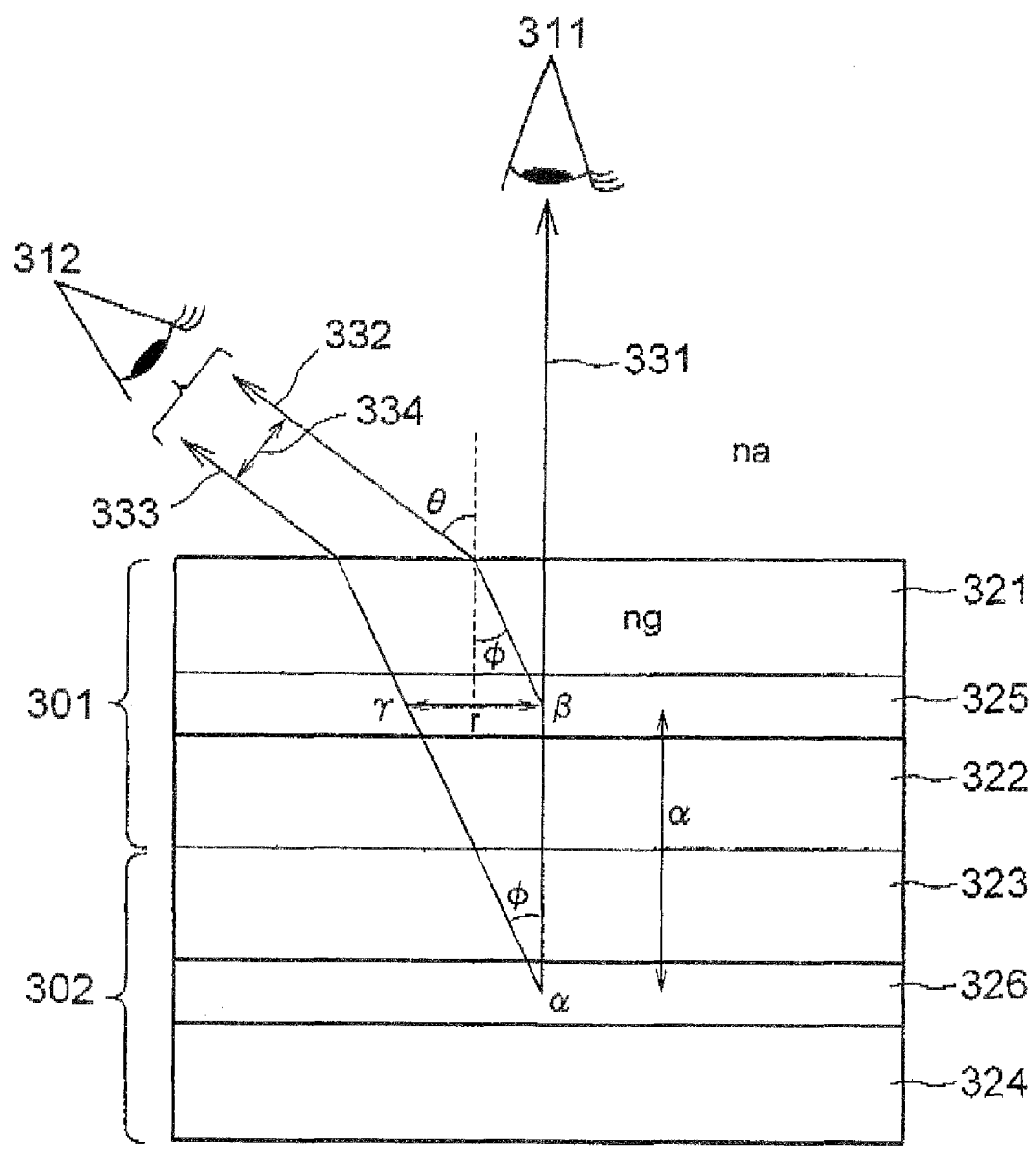
FIG. 4 is a schematic sectional view of the LCD unit of FIG. 3, showing the optical path from the LCD unit to an observer.

FIG. 4 shows a simplified structure of the LC panels as described above for showing the problem of the parallax. In FIG. 4, only the transparent substrates and LC layers among the constituent elements in FIG. 3 are depicted, wherein LC panels 301 and 302 correspond to the LC panels 133 and 136, respectively, and LC layers 325 and 326 correspond to the LC layers 231 and 232, respectively.

Observation of the LC panels 301 and 302 by an observer 311 in the line of sight denoted by numeral 331 that is perpendicular to the screen of the LCD unit allows a point α on the second LC panel 302 and a corresponding point β on the LC panel 301 to overlap each other. Thus, both the points α and β are observed as the same point in the line of sight 331 by the observer 311. More specifically, observation in the normal direction does not cause a parallax, thereby providing substantially no sense of discomfort to the observer 311. On the other hand, observation of the LC panels 301 and 302 by an observer 312 in a viewing direction slanted from a perpendicular of the screen by an angle θ causes both the points α and β to be apart from each other due to the distance "d" therebetween. The point α is observed in the sight of view 332, whereas the point β is observed in the sight of view 333, whereby a parallax 334 is conceived by the observer 312. The parallax 334 causes a single line or single point in the image data to be observed as double lines or double points, to incur a sense of discomfort in the observer.

Light passed by the first LC panel 301 and second LC panel 302 is emitted through the transparent substrate 321 into the air, whereby the direction of light is changed due to Snell's law depending on the difference in the refractive index between the transparent substrate 321 and the air. Assuming that θ, φ, ng and na are the emission angle of light from the transparent substrate 321, incidence angle of light onto the surface of the transparent substrate 321, refractive index of the transparent substrate 321 and refractive index of air, respectively the following formula:

$$na \times \sin\theta = ng \times \sin\phi$$

holds based on the Snell's law. Transformation of the above formula provides the following relationship:

$$\phi = \sin^{-1}((na/ng) \times \sin\theta).$$

From the relationship of alternate angle, the angle between the light advancing from the point β toward the surface of the transparent substrate 321 and a perpendicular of the transparent substrate 321 can also be expressed similarly. The same applies to the point α. The apparent, distance "r" between the point α and the point β on the LC panel 301 as observed in a viewing direction of θ can be obtained as follows:

$$\tan\phi = r/d$$

$$r = d \times \tan\phi = d \times \tan(\sin^{-1}((na/ng)) \times \sin\theta) \quad (1).$$

For removing the parallax in the slanted viewing direction, it is effective to extend a point image, which is to be displayed originally on the point β of the LC panel 301, to have a linear image having a length of r, as shown in FIG. 4. Thus, the present embodiment employs an averaging processing wherein the information to be displayed on the point β is scattered onto the line segment between the point β and a point γ which is apart from the point β by a distance "r". The averaging processing reduces the sense of parallax to provide a comfortable image on the LCD unit. The averaging processing may be performed to the image data of any of the LC panels 301 and 302. In the view point of reduction in the sense of parallax, an equivalent advantage can be obtained by the averaging processing of image data for any of the LC panel 301 including color filter layers ad the LC panel 302 including no color filter layers. Similarly, an equivalent advantage can be obtained by the averaging processing of the image data for any of the front-side LC panel and the rear-side LC panel, the terms "front-side" and "rear-side" being used herein based on the standpoint of the observer.

If the averaging processing is performed onto the image data for the rear-side LC panel, i.e., second LC panel 302, an optical component such as a light diffusion film may be inserted between the first LC panel 301 and the second LC panel 302. The optical component having a light diffusion function apparently enlarges the distance r' which is obtained by the averaging processing of the data for the LC panel 302 in the image processing. The distance r' may be expressed by the following formula:

$$r'=(d' \times \tan\phi)+((d-d') \times (\tan(\phi+\eta)),$$

where d' and η are the distance between the optical component and the LC layer 326 and the diffusion angle (half-value-width diffusion angle), respectively. The image processing should preferably consider the effect or this enlargement of the distance by the optical component.

The present inventors conducted investigation of the drive scheme for the LCD unit including the two LC panels, and found a suitable drive scheme as detailed hereinafter. The suitable drive scheme is such that the averaging processing is performed onto the image data for a LC panel (such as 302) including no color filters, and this LC panel (302) is stacked onto another LC panel (such as 301) including color filter layers. The reason for performing the averaging processing onto the data for the LC panel including no color filters is that the averaging processing of the image data for the LC panel including color filters may mix the three colors to form a dull color tone and reduce the reproducible range of color.

Figure 5:
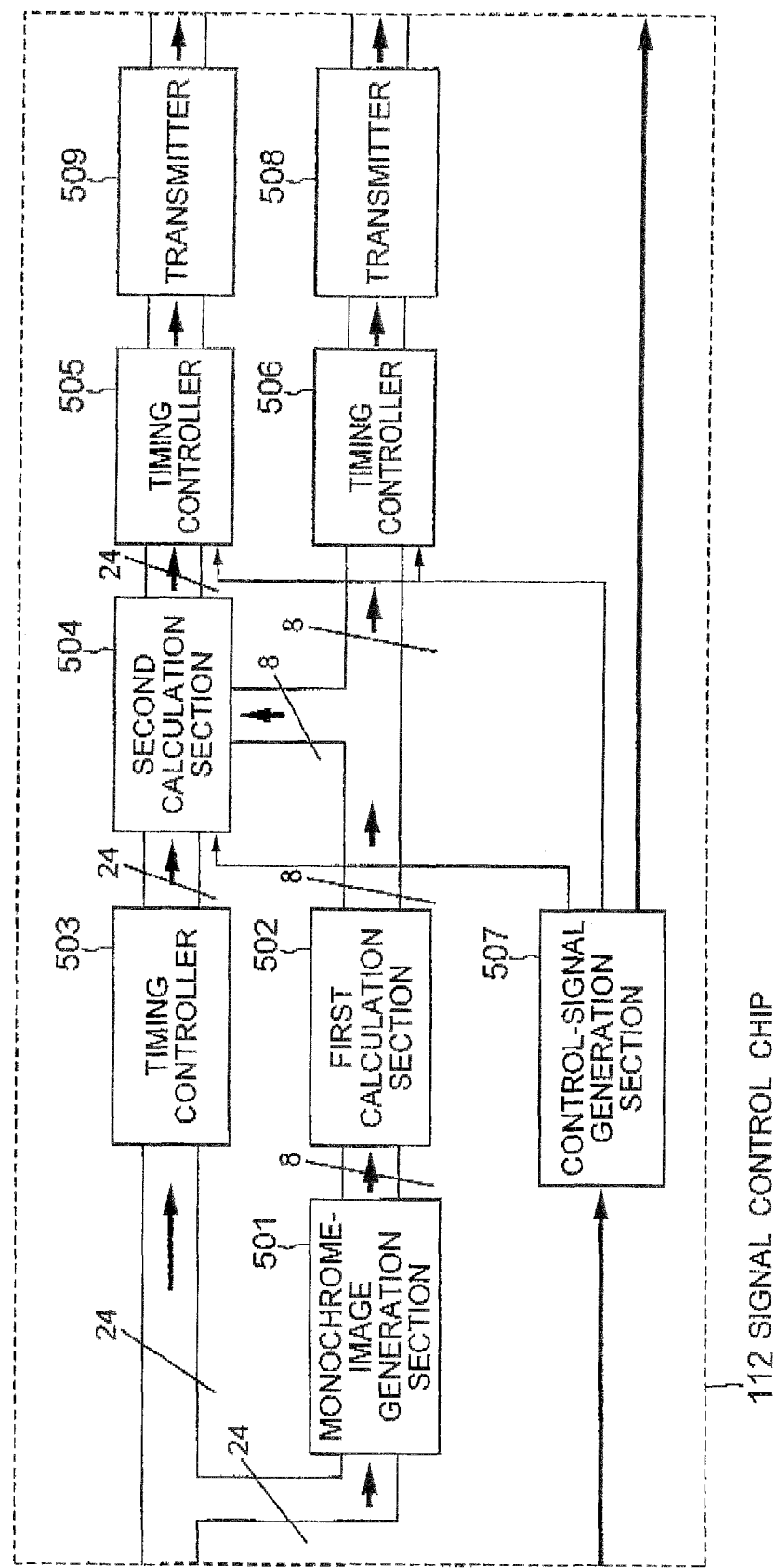
FIG. 5 is a functional block diagram of the IC driver in the electronic display system of FIG. 1.

FIG. 5 shows a functional block diagram of the signal control chip 112. The signal control chip 112 includes a monochrome-image generation section 501, a first calculation section (averaging processing section) 502, timing controllers 503, 505 and 506, a second calculation section 504, a control-signal generation section 507, and transmitters 508 and 509. The second calculation section 504 acts as the moving-picture judgment section 114 shown in FIG. 1, which judges whether the delivered picture is a moving picture or a still picture. The control-signal generation section 507 acts as a mode switching section 115 which performs switching of the scanning direction for the first LC panel 133. The output signal of the second calculation section 504 is delivered to the first LC panel 133 through transmitter 509 via timing controller 505. The output signal from the first calculation section 502 is delivered to the second LC panel 136 through transmitter 508 via timing controller 506.

Synchronization signals including V-Sync, H-Sync, Dot Clock for the image data are input to the signal control chip 112 through the receiver 111. The signal control chip 112 performs re-processing for the received synchronization signals in the control-signal generating section 507 to deliver an internal synchronization signal for synchronization between the same and each of the signal control chip 112 and LCD unit 130. In the present embodiment, since FPGA supplied from Altera Corp. is used as the signal control chip 112, the storage capacity for temporarily storing the image data is insufficient. Thus, an external storage unit configured by a SRAM is provided to the signal control chip 112. However, if the signal control chip 112 is configured by a full-custom ASIC or a DRAM-mounting ASIC, the image data can be stored in the ASIC and the external storage unit may be omitted. Thus, the external storage unit is not depicted in FIG. 5. The timing controllers 503, 505 and 506 and first and second calculation sections 502 and 504 each include a storage unit therein. The storage capacity needed for the storage unit of the timing controllers 503, 504 and 505 is relatively small, and thus a line buffer may be used for the storage unit of the timing controllers 503, 504 and 505. The line buffer may be configured by a built-in buffer installed in FPGA.

The signal control chip 112 receives, for example, a 24-bit image data signal including S-bit data for each prima color from the receiver 111. This image data signal is separated in the signal control chip 112 into a color-image data signal displayed on the first LC panel 133 (FIG. 1) and a monochrome-image data signal displayed on the second LC panel 134. More specifically, the image data signal received by the signal control chip 112 is delivered to the monochrome-image generation section 501 which generates a monochrome gray-scale level signal, ad to the timing controller 503 which reads and outputs the signal in the order of receiving the image data signal based on the timing of the output side.

The monochrome-image generation section 501 generates an 8-bit monochrome image signal based on the luminescence information of the input 24-bit color image data signal. Generation of the monochrome image data is performed by judging the gray-scale level of each primary color data (i.e., red, green and blue) for each pixel, and selecting a maximum gray-scale level among the gray-scale levels of the three primary colors as the converted gray-scale level of the each pixel after conversion of the monochrome image data. In an alternative, a HSV conversion that converts the input image data to the information of brightness, chromaticness and chromaticity is performed, and only the information of brightness is extracted to configure the monochrome data. In a further alternative, one of the R, G and B color data may be selected for the converted monochrome image data or two of the R, G and B color data may be selected and converted into the monochrome data. It is to be noted that the area or pixel having a higher gray-scale level (i.e., transmittance) of the monochrome image data generally corresponds to an area or pixel having a higher brightness or higher chromaticness.

The monochrome-image generation section 501, after converting the input image data into the monochrome image data, selects a specific transmittance for a pixel having a transmittance equal to or above a threshold, and selects a transmittance corresponding to the transmittance of the original color image data for a pixel having a transmittance below the threshold. In this processing, the monochrome-image generation section 501 compares the gray-scale level of each pixel of the converted monochrome image data against the threshold determined beforehand, to select the specific transmittance, preferably a full transmittance, if it is judged that the gray-scale level of the pixel is equal to or above the threshold. In the description to follow, the specific transmittance is assumed to be the full transmittance. If it is judged that the gray-scale level of the pixel is lower than the threshold, the transmittance of the pixel is recalculated by using a gray-scale level conversion to assume a corresponding value between the full transmittance and a minimum transmittance.

The conversion processing wherein a gray-scale level above the threshold is replaced by the full transmittance may be modified from the above processing. For example, a γ-curve conversion processing wherein the γ-value is round 4.0 may be used to allow pixels having a gray-scale level above a specific value to have a full transmittance. In an alternative, a histogram conversion or adjustment may be used to allow pixels having a gray-scale level above a specific value to have a full transmittance. It is sufficient that the monochrome-image generation section 501 obtain a monochrome image data wherein pixels having a relatively higher transmittance have a full transmittance, and thus the technique for generating the monochrome image data or the technique for converting a relatively higher transmittance to the full transmittance may be modified from the above example, or any other technique may be employed instead.

The first calculation section 502 performs an averaging processing onto the monochromatic image data generated by the monochrome-image generation section 501. The averaging processing may use the technique described in Patent Publication JP-2007-286413A, the description of which is incorporated herein in its entirety by reference. In this technique, the image data of pixels located within a specific distance, which corresponds to the distance "r" in FIG. 3, from a target pixel are averaged. This averaging processing may employ a weighted averaging processing where the weighting factor depends on the distance from the central pixel. The weighting factor may be assumed to depend on the Gaussian distribution. The averaging processing allows the monochrome image data to have a dull edge in the picture. The monochrome image data subjected to the averaging processing in the first calculation section 502 is delivered to the second LC panel 136 via timing controller 506 and transmitter 508.

The second calculation section 504 generates color image data for the first LC panel 133, based on the 24-bit color image data delivered through timing controller 503 and monochrome image data subjected to the averaging processing in the first calculation section 502. The second calculation section 504 performs calculation processing onto the 24-bit color image data based on the monochrome image data delivered from the first calculation section 502, to generate a color image signal. More specifically, the second calculation section 504 divides the input color image data by the brightness of the monochrome image data, to thereby generate image data having a corrected brightness. However, if the brightness of the monochrome image is at a zero level, the process of division by zero is replaced by a exceptional procedure that is determined beforehand. In an alternative, the zero level of the monochrome image data is shifted toward a higher level by a specified level to avoid the division by zero. Upon generation of the color image signal in the second calculation section 504, a correction processing may be additionally performed onto the original image signal. The color image data generated by the second calculation section 504 is delivered to the first LC panel 133 through transmitter 509 and timing controller 505.

The second calculation section 504 has a function of comparing the image data of the present frame against the image data of the previous frame, to judge whether or not there occurs a change of image data. If the image of pixels in number corresponding to 5% of the total number of pixels is changed, and this state continues for one second, the second calculation section 504 judges that the picture remains at or shifted to the moving picture. If the number of pixels having a change in the image is below 1% of the total number of pixels and this state continues for 30 seconds, the second calculation section 504 judges that the picture remains at or shifted to a still picture. The second calculation section 504 notifies, upon detecting the shift to a moving picture or a shift to a still picture, the occurrence of the shift to the control-signal generation section 507. If a shift to the moving picture is notified, the control-signal generation section 507 instructs the vertical driver 131 shown in FIG. 1 to switch the scanning direction to a downward scanning direction. On the other hand, if a shift to the still picture is notified, the control-signal generation section 507 instructs the vertical driver 131 to switch the scanning direction to an upward scanning direction.

The second calculation section 504 instructs, upon detection of a shift to the moving picture or still picture, timing controller 505 to switch the order of transmission signal to an opposite order. More specifically, if the second calculation section 504 detects a shift to the moving picture, timing controller 505 delivers the image data in a normal transmission order from the top row to the bottom row. On the other hand, if the second calculation section 504 detects a shift to the still picture, timing controller 505 delivers the image data in a reversed transmission order from the bottom row to the top row. Due to this operation wherein the control-signal generating section 507 changes the scanning direction of the vertical driver 131 and timing controller 505 switches the transmission order of the image data, the first LC panel 133 switches scanning direction between the upward scanning direction and the downward scanning direction.

In the LCD unit 130 of the present embodiment, as described heretofore, the first LC panel 133 is driven by the color image data generated in the second calculation section 504, whereas the second LC panel 136 is driven by the monochrome image data generated by the monochrome-image generation section 501 and subjected to the averaging processing in the first calculation section 502. If only the image of the second LC panel 136 is observed, a portion of the screen receiving image data having a relatively higher brightness has a full transmittance and the rest of the screen has a dull image due to the averaging processing. On the other hand, if only the image of the first LC panel 133 is observed, a portion of the screen corresponding to the portion of the second LC panel 136 having a dull image has an emphasized image that is emphasized in the brightness and chromaticness thereof from the original color image data.

In the structure of FIG. 5, the control-signal generating section 507 is installed in the signal control chip 12 which also includes therein signal processing sections including the control-signal generating section 507 for generating a timing signal controlling the operation of the chip. It is to be noted however that the control-signal generating section 507 may be provided outside the signal control chip 112 to provide an external control signal to the chip. In a further alternative, a plurality of signal control chips may be provided in the LCD system, wherein one of the signal control chips provides, together with a data signal, a synchronizing signal generated therein to a succeeding one of the signal control chips.

In order to verify effects of the present embodiment, the LCD system of FIG. 1 was operated to display a picture on the LCD unit 130 including the first LC panel 133 and second LC panel 136. The LCD unit 130 provided superior brightness ad chromaticness comparable to the brightness and chromaticness, respectively, of the first LCD panel 133 used alone for display of an ordinary color image data. The LCD unit 130 also provided a superior contrast ratio as high as 500,000:1, which the first LCD panel 133 alone could not provide. In a slanted viewing direction, the LCD unit 130 provided a superior image quality substantially without die influence by a parallax due to the averaging processing performed in the second LC panel 136. The first LC panel as well as the second LC panel used alone had a contrast ratio of around 700:1. If the LC panel alone has a contrast ratio of 1000:1, die LCD unit including two of this LC panel stacked one on another may provide a higher contrast ratio as high as 1,000,000:1. Three or more of the LC panel stacked one on another may provide a further higher level of the contrast ratio, the magnitude of which an ordinary contrast-ratio measurement device cannot measure.

The example of LCD system shown in FIG. 1 included the image source unit 100, signal processing unit 110, and LCD unit 130 which are provided separately from one another; however, these units need not be provided as separate hardware and may be configured as a single member or included in a single housing. In an alternative, the LCD unit 130 may be separated from the image source unit 100 and signal processing unit 110, which are integrated with each other or received in a single housing. The signal processing in the signal processing unit 110 may be performed, instead of using hardware, by using software including a plurality of image processing programs running on a CPU and/or a signal processor.

In the above configuration, the first and second calculation section 502 and 504 in the signal control chip 112 perform calculation processing for the image data to thereby generate picture data. However, the signal processing need not be a calculation processing, and may use a lookup table which defines the relationship determined beforehand by calculation between the input image data and the output image data. In this case, for example, the monochrome-image generation section 501 may include a selector for selecting a color sub-pixel that has a maximum brightness among the three color sub-pixels, and output of the first calculation section 502 for performing the averaging processing of the monochrome imaged data is used for adjustment of brightness with reference to the lookup table. The lookup table may be a single-dimensional table tabulating a set of input image signals and a set of output image signals. The advantage of using such a lookup table is that the relationship between the input image data and the output image data may be arbitrarily defined therein to obtain a fine brightness adjustment. This suppresses occurring of a discontinuous point that incurs a problem in the calculation processing.

On the other hand, the second calculation section 504 uses the input color data and a set of image data created in the first calculation section 502. In this case, since at least one-dimensional image data generated in the first calculation section 502 is added to the n-dimensional input image data, the second calculation section 504 uses a lookup table having (n+1)-dimensional image data that is one dimension higher than the n-dimensional image data. In the present embodiment, the second calculation section 504 uses a four-dimensional lookup table, which provides a gray-scale level of the color image data from the gray-scale level of the input RGB image data and gray-scale level of the monochrome image data generated by the first calculation section 502, thereby generating the color image data to be used in the first LC panel 133.

In an alternative, the input RGB image data is subjected to a HSV conversion to generate separate data including hue, chromaticness and brightness data. A set of the brightness data thus obtained and another set of monochrome image data created by the first calculation section 502 are used as the base data to create a two-dimensional lookup table, whereby a new set of brightness data is generated. The new set of brightness data of the image signal is combined with the hue and chromaticness data separated before, to thereby generate a new RGB gray-scale level, which is input to the first LCD panel 133 via timing controller 505 and transmitter 509, to thereby display a color picture. In this case either, the lookup table is a two-dimensional lookup table, whereby the lookup table used in the second calculation section 504 is one dimension higher than the dimension of the lookup table used in the first calculation section 502.

In the above embodiment, it is unnecessary to install the lookup table in both the first calculation section 502 and second calculation section 504. In this case, the first calculation section 502 perform an ordinary logic calculation processing (i.e., at zero dimension), and the second calculation section 504 uses a lookup table having two dimensions. In the present embodiment, the first LC panel 133 includes color filter layers 251 (FIG. 3); however, the color filter layers are not an indispensable constituent element that solves the parallax problem in the image data subjected to the averaging processing. Accordingly, the first LC panel 133 may be configured by a monochromatic LC panel similarly to the second LC panel 136, to provide a monochrome LCD unit.

In the above embodiment, the second LC panel 136 may have three pixels corresponding to RGB color filter layers of the first LC panel 133. However, the color filter layers need not be RGB color filters, and may be other primary color filters, or may be multiple-color filters including RGBYMC, for example. In such a case, a single pixel may be divided into a plurality of sub-pixels corresponding to a desired number of multiple-color filters. A single pixel may be divided into four sub-pixels such as R, G, G and B, or into four sub-pixels corresponding to three color filters and including an additional colorless (W) sub-pixel.

Although an IPS-mode LCD unit is exemplified in the above embodiment, the drive mode of the LCD unit may be a vertical alignment (VA) mode, twisted nematic (TN) mode, optically-compensated-bent mode etc. In the example of FIG. 3, a retardation compensating film is not provided therein; however, a retardation compensating film may be provided between the first LC element 261 and each of the polarizing films 201 and 202, and between the second LC element 262 and each of the polarizing films 203 and 204, for improving the viewing angle characteristic. Upon insertion of the retardation compensating film, the optical characteristic of the retardation compensating film may be determined depending on the mode of the LC layer to be employed, as will be detailed below.

If a retardation compensating film is inserted within the first LC panel 133 in case of the first LC panel 133 being driven in an IPS mode, it is effective to insert the retardation compensating film between the polarizing film 201 and the first LC element 261 and between the polarizing film 202 and the First LC element 261. Assuming that the retardation compensating film has a maximum refractive index of nx, a refractive index of ny in the direction normal to the direction of nx within the substrate plane, and a refractive index of nz in the direction normal to the direction of nx and ny, it is preferable that the retardation compensating film has a characteristic of. nx≧nz>ny and be arranged so that the direction of nx is parallel to the optical absorbing axis or optical transmission axis of the polarizing films 201 and 202. This arrangement improves the viewing angle characteristic of the first LC panel 133. The retardation compensating film may include a plurality of layers having an overall characteristic satisfying the above relationship for the refractive indexes nx, ny and nz.

If the first LC panel 133 is driven in a VA mode, it is preferable that the retardation compensating film having a relationship of nx≧ny>nz is arranged so that the direction of nx is parallel to the optical absorption axis or optical transmission axis of the polarizing films 201 and 202 to improve the viewing angle characteristic. If the LC panel is driven in a TN mode or OCB mode, it is preferable that the retardation compensating film be configured by a wide view (WV) film including a discotic LC layer that has a negative retardation and an optical axis having a direction varying with the thickness-wise position thereof. This retardation compensating film also improves the viewing angle characteristic.

The retardation compensating film may be inserted only at one side of each of the LC elements 261 and 262, or may be inserted on both sides thereof. Although the above description is such that the retardation compensating film may be inserted between each of the LC elements 261 and 262 and the associated polarizing films 201-204, the retardation compensating film may be inserted at any position between each of the LC layers 231 and 232 and the associated polarizing films 201-204 at any location. In additions the retardation compensating film may include a plurality of layers. Further, the above description premises that the optical transmittance of the second LC panel 136 has a constant value so long as the pixel has a transmittance above the threshold; however, the optical transmittance may have a range of variation so long as the range of variation is within several percents of the total transmittance.

In the present embodiment, the description exemplifies a vertical scanning direction; however, the scanning direction is not limited to the vertical direction, and may be a horizontal direction or even a slanted direction depending on the circumstances. In the present embodiment, the scanning direction is switched depending on the moving picture or still picture. However, if the most of the pictures to be displayed is a moving picture as in the case of a TV set, the scanning direction may be fixed to the same direction in the LC panels configuring the LCD unit. If the most of the pictures is a still picture as in the case of a LCD unit used for display in an art museum or for an X-ray image, the scanning direction may be fixed to opposite scanning directions. For fixing the scanning direction, it is sufficient to fix the result of judgment as to the still picture or moving picture to one of the still picture and moving picture.

In the present embodiment, the first LC panel 133 and second LC panel 136 have the same resolution; however, both the LC panels may have some difference therebetween in the resolution. The first LC panel 133 disposed at the front side may have a higher resolution than the second LC panel 136 disposed at the rear side, and vice versa. If both the LC panels have different resolutions, it is preferable that a signal conversion processing be performed before the signal processing by the monochrome-image generation section 501 in the signal control chip 112. If the monochrome image signal delivered from the first calculation section 502 is used in the second calculation section 504, it is preferable at the resolution be converted for adapting to the second calculation section 504.

In the above example, the signal control chip 112 was configured by a FPGA1 chip for performing the verification for operation; however, the signal control chip may be configured by a plurality of chips which are interconnected by external wirings. In the present embodiment, the judgment whether or not the picture is a moving picture is performed immediately after the signal processing unit 110 receives the image signal from the image source unit 100; however the judgment is not limited at this timing. More specifically, the judgment may be performed at any signal path because the judgment is performed for the image data between the frames based on the ratio of the pixels having a change between the frames. In the above embodiment, the second calculation section 504 acts as a moving-picture judgment section 114; however, the first calculation section 502 for processing the monochromatic image data may act as the moving-picture judgment section 114. In an alternative, the moving-picture judgment may be performed using both the first calculation section 502 and second calculation section 504. In a further alternative, timing controllers 505 and 506 may perform the moving-picture judgment.

In the present embodiment, the moving-picture judgment is performed based on the signal change between the frames. However, if the picture has a movement in the pixels, a specific color signal or brightness thereof may be used for the moving-picture judgment because the movement in the pixel is accompanied by a brightness change at any time. In the case wherein the moving-picture judgment is performed based on the specific color signal or brightness thereof the memory capacity needed for the judgment can be reduced compared to the case wherein the entire picture is compared between the frames, thereby reducing the cost needed for the judgment. The moving-picture judgment section 114 need not be installed within the signal control chip 112, and may be separately provided outside the signal control chip 112. In this case, it is sufficient that only the control signal is output in synchrony with the signal from the control-signal generating section 507.

In the present embodiment, when the scanning direction is opposite between the first LC panel 133 and the second LC panel 136, the scanning is started at the bottom row in the first LC panel 133 and at the top row in the second LC panel 136. However, the starting position for the scanning may be selected as desired, and thus the starting position is not limited to the top row or bottom row. The starting positions are not limited to the top row and bottom row in both the LC panels that are symmetric to each other with respect to a central row. For example, a scanning line that is five line above the bottommost scanning line may be used as the starting row in the first LC panel 133, whereas a scanning line that is three lines below the topmost scanning line may be used as the starting row in the second LC panel 136. In a further alternative, the scanning may be started at the same scanning line in both the first ad second LC panels, and the direction of the scanning is opposite in both the first and second LC panels.

In the present embodiment, the scanning direction is opposite between the first LC panel 133 and the second LC panel 136. This configuration reduces the flicker in the stacked LCD unit including a plurality of LC panels stacked one on another. In addition, the picture to be displayed on the LCD unit is subjected to moving-picture judgment as to whether the picture is a moving picture or a still picture. If the picture is a still picture, opposite scanning directions are employed in the first and second LC panel 133, 136, whereas if the picture is a moving picture, the same scanning direction is employed in the first and second LC panels 133, 136. This reduces the sense of discomfort in the observer during display of a moving picture, while reducing the influence by the flicker during display of a still picture.

A LCD unit according to a second embodiment of the present invention will be described hereinafter again with reference to FIG. 1. In the first embodiment, the moving-picture judgment section 114 judges whether the picture is a moving picture or a still picture based on the change of image data occurring between frames, to switch the operation mode of the LCD unit 130. In the present embodiment, the image source unit 100 supplies information specifying whether the picture delivered from the image source unit 100 is a moving picture or still picture, whereby the LCD unit 130 switches the operation mode based on the delivered information. The other configurations are similar to those in the first embodiment.

In the second embodiment, it is assumed here that the image source unit 100 is a personal computer, on which an application such as action game program or video player program is started to run. In this case, most of the data delivered from the image source unit 100 is a moving picture. The image source unit 100 detects that a specific application program providing a moving picture is started to run on the computer, to deliver a moving-picture flag to the signal processing section 110. The moving-picture flag may use a signal line such as USB (universal serial bus) or RS232C provided separately from the other signal lines, or may use the signal cable 103 for transmission together with the image data.

The signal control chip 112, upon absence of the moving-picture flag, determines the opposite scanning directions for the first LC panel 133 and the second LC panel 136. The signal control chip 112, upon occurrence of the moving-picture flag, judges that reproduction of a moving picture is started and determines the same scanning direction for the first LC panel 133 and the second LC panel 136. This configuration allows the LCD unit 130 to use the same scanning direction for the first LC panel 133 and second LC panel 136, if reproduction of a moving picture program is started to decode the moving picture of compressed data such as MPEG data.

In the present embodiment, the signal processing unit 110 receives, from the image source unit 100, information (flag) that specifies whether or not a specific application program that mostly delivers a moving picture is started, and changes the scanning direction of the first LC panel 133 based on the received flag. This configuration allows the first LC panel 133 and second LC panel 136 to employ opposite scanning directions and thus reduce the flicker, during reproduction of a still picture. The configuration also allows the first LC panel 133 and second LC panel 136 to employ the same scanning direction during reproduction of the moving picture, ad thus reduces the sense of discomfort perceived by the observer.

A LCD system according to a third embodiment of the present invention will be described hereinafter. The above embodiments premise that the light source 137 (FIG. 1) includes a cold cathode fluorescent light (CCFL) or light emitting diode (LED) that emits a white and uniform light. In the present embodiment, the light source emits RGB lights by using a time-sharing scheme. The stacked LC panels of the LCD unit 130 each display a picture in a field sequential mode by using a time-sharing scheme. The processing in the first LC panel 133 and second LC panel 136 for generating image data is similar to that in the first exemplary embodiment. Moreover, the opposite scanning directions are used in the first and second LC panels during display of a still picture for reducing the flicker in the present embodiment as well. Upon display of a moving picture, the same scanning direction is used also in the first and second LC panels for reducing the sense of discomfort in the observer. Thus, the advantages of the present embodiment are similar to those in the first ad second embodiments. A color picture is preferably displayed on the LCD unit of the present embodiment.

A LCD system according to a fourth embodiment of the present invention will be described hereinafter. In the present embodiment, the LCD unit is driven in a drive mode such as a TN mode wherein the voltage applied to the LC layer changes the angle of LC molecules with respect to the substrate surface. Such a drive mode generally suffers from the problem of viewing angle dependency wherein the viewing angle range allowing the picture to be observed depends on the viewing direction of the observer with respect to the LCD unit. This problem results from the fact that change of the angle of LC molecules with respect to the substrate surface varies birefringence characteristic of the LC molecules depending on the viewing direction of the observer. When a plurality of such LC panels are stacked one on another, it is considered that degradation of the image quality caused by the viewing angle dependency increases depending on the number of the stacked LC panels providing a synergetic effect. For avoiding the synergetic effect in the present embodiment, adjacent two, for example, of the stacked LC panels are allowed to have opposite viewing angle dependencies. The opposite viewing angle dependencies cancel each other in the adjacent LC panels, whereby the viewing angle range is averaged for the viewing directions.

The above embodiments use TFTs as three-terminal non-liner devices for driving the pixel electrodes in each LC panel; however the non-linear devices are not restricted to the TFTs. For example, the non-linear devices may be two-terminal devices such as thin-film diodes (TFDs). In an alternative, the LC panels may be driven in a simple-matrix drive scheme without using the non-linear devices so long as the LCD unit has a relatively lower resolution. The LCD units according to the above exemplary embodiments achieve the advantage of higher contrast ratio, whereby the LCD units can be preferably used as a image display unit of a diagnostic imaging device for which a higher contrast ratio is desired, a monitor used in a broadcasting station, a LCD unit of an electronic equipment used in a dark room, such as a movie theater.

A LCD unit according to a fifth embodiment of the present invention, will be described hereinafter. In the first embodiment, the same canning direction used for display of a moving picture in the first LC panel 133 and second LC panel 136 cannot achieve the advantage of reduction in the flicker. In the present embodiment, the same scanning direction is used for reducing the flicker by employing a configuration wherein the starting row for staring the scanning in the first LC panel 133 is adjusted with respect to the starting row in the second LC panel 136. More specifically, a topmost row (scanning line) is selected as the starting row of the first LC panel 133, whereas a central row is selected as the starting row in the second LC panel 136. In this configuration, each of the first and second LC panels 133, 136 selects consecutively the own scanning lines with a specific space being maintained from the scanning line of the other of the first and second LC panels 133, 136.

As described in connection with the first embodiment, the initial voltage Vs of each pixel of the first LC panel 133 and second LC panel 136 immediately after writing data into the each pixel is expressed by:

$$Vs=Qs/C1,$$

whereas the final voltage Ve of the each pixel immediately before writing data in the next frame is expressed by:

$$Ve=(Qs-Qr)/C1.$$

Assuming that the voltage drop from Vs to Ve as described above is linear with respect to time, when a pixel of the first LC panel 133 has a midpoint potential between Vs and Ve, i.e., (Vs+Ve)/2, the corresponding pixel of the second LC panel 136 has a potential of Vs because of the difference in the starting row of the scanning. Similarly, when a pixel of the second LC panel 136 has a midpoint potential between Vs and Ve, the corresponding pixel of the first LC panel 133 has a potential of Vs. The potential difference between the pixel of the first LC panel and the corresponding pixel of the second LC panel is suppressed to half the potential difference Vs−Ve, which the case of scanning at the same starting row provides.

The scanning scheme of the present embodiment reduces the potential difference between the corresponding pixels of the first and second LC panels down to half the potential difference that the same starting row provides between the corresponding pixels of the first and second LC panels. This allows each pixel of the LCD unit to have a range of variation in the light intensity which is half the range of variation in the light intensity that the same starting row provides. Moreover, the frequency of the flicker is doubled up to 120 Hz, if the drive frequency is 60 Hz, for example. A higher flicker frequency reduces the sense of discomfort caused by the flicker in the observer.

In the present embodiment, as described above, the starting row for scanning in each frame is differentiated between the first LC panel 133 and the second LC panel 136, thereby reducing the range of variation in the light intensity between corresponding pixels and raising the flicker frequency to reduce the sense of discomfort caused by the flicker. In the present embodiment, the same scanning direction is employed for the first LC panel 133 and second LC panel 136.

However, the opposite scanning directions may be employed in association with the different staring rows. This reduces the flicker frequency to suppress the sense of discomfort caused by the flicker.

In the above embodiments, the second calculation section 504 created 24-bit color image data from the 8-bit image data for each RGB sub-pixels. The number of bits of the input data and output data is not limited to this example. For example, if it is assumed that the number of gray-scale levels of each LC panel in a plurality (n) of stacked LC panels is m, then the maximum number of gray-scale levels represented by the LCD unit is m×n. Thus, the present invention may employ a configuration wherein the number of gray-scale levels in the input image data is between "m" and "m$^2$" inclusive of both, and the second calculation section 504 creates color image data having m gray-scale levels from the input image data.

In the above embodiments, the LCD unit 130 includes two LC panels, for the sake of simplification for the description. However, the LCD unit may include three or more LC panels. If a plurality (n, which is equal to or larger than two) of LC panels is used, a single color LC panel is preferably provided therein. The single color LC panel reduces the range of variation in the brightness of transmitted light even if the viewing direction is changed, compared to the case where a plurality of color LC panels are provided.

If the LCD unit 130 includes a plurality (n, which is equal to or larger than two) of LC panels, at least one LC panel among them preferably has a scanning direction opposite to the scanning direction of the remaining LC panels. If the LCD unit includes three LC panels, for example, a configuration may be employed wherein a front LC panel and a rear LC panel are scanned upward for example, and the central LC panel is scanned downward to reduce the flicker.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A liquid crystal display (LCD) unit comprising:
a plurality of liquid crystal (LC) panels each including an array of pixels, said LC panels being stacked one on another so that corresponding pixels of said LC panels are aligned with one another for display of a picture; and
a backlight source emitting light onto a rear side of said stacked LC panels,
wherein a plurality of rows of pixels of at least one of said LC panels are scanned consecutively in a first scanning direction from a first row of said pixels, and a plurality of said pixels of rest of said LC panels are consecutively scanned in a second scanning direction from a second row of said pixels, and
wherein i) said first scanning direction is the same as said second scanning direction during display of a moving picture, and ii) said first scanning direction is opposite to said second scanning direction during display of a still picture.

2. A liquid crystal display (LCD) unit comprising:
a plurality of liquid crystal (LC) panels each including an array of pixels, said LC panels being stacked one on another so that corresponding pixels of said LC panels are aligned with one another for display of a picture;
a backlight source emitting light onto a rear side of said stacked LC panels, wherein,
a plurality of rows of said pixels of at least one of said LC panels are scanned consecutively in a first scanning direction from a first row of said pixels, and a plurality of said pixels of rest of said LC panels are consecutively scanned in a second scanning direction from a second row of said pixels, and
said first scanning direction is opposite to said second scanning direction, and/or said first row is different from said second row; and
a mode switching section for selecting one of a first mode wherein a plurality of rows of said pixels of said LC panels are scanned consecutively in the same direction from the same row, and a second mode wherein a plurality of rows of said pixels of at least one of said LC panels are scanned consecutively in a first scanning direction from a first row of said pixels, a plurality of said pixels of rest of said LC panels are consecutively scanned in a second scanning direction from a second row of said pixels, and said first scanning direction is opposite to said second scanning direction and/or said first row is different from said second row.

3. The LCD unit according to claim 2, wherein said mode switching section switches between said first mode and said second mode at an interval between two of writing periods for said pixels.

4. The LCD unit according to claim 2, further comprising a moving-picture judgment section for judging whether the picture is a still picture or a moving picture, wherein said mode switching section selects said first mode if said moving-picture judgment section judges that the picture is the moving picture, and selects said second mode if said moving-picture judgment section judges that the picture is the still picture.

5. The LCD unit according to claim 4, wherein said moving-picture judge section performs said judgment based on a ratio of number of pixels for which image data is changed to a total number of said pixels.

6. The LCD unit according to claim 5, wherein said moving-picture judgment section judges that the picture is the moving picture if said ratio exceeds a first threshold, and judges that the picture is the still picture if said ratio is below a second threshold which is lower than said first threshold.

7. The LCD unit according to claim 6, wherein said moving-picture judgment section judges that the picture is the moving picture if a state where said ratio exceeds said first threshold continues a first time period, and judges that the picture is the still picture if a state where said ratio is below said second threshold continues a second time period.

* * * * *